United States Patent [19]
Portis

[11] 3,815,416
[45] June 11, 1974

[54] CONTROL SYSTEM FOR ROD TYPE TANK GAGE

[75] Inventor: Ralph G. Portis, Highland Park, Ill.

[73] Assignee: Midland Manufacturing Corp., Skokie, Ill.

[22] Filed: Oct. 6, 1972

[21] Appl. No.: 295,735

[52] U.S. Cl............. 73/306, 73/DIG. 5, 340/244 A
[51] Int. Cl............................................ G01f 23/12
[58] Field of Search ........ 73/306, 307, 314, DIG. 5; 340/244 R, 244 A

[56] References Cited
UNITED STATES PATENTS

| | | | |
|---|---|---|---|
| 2,820,865 | 1/1958 | McKinnies | 73/DIG. 5 |
| 3,114,478 | 12/1973 | Hilkemeier et al. | 73/308 X |
| 3,359,799 | 12/1967 | Lubin | 73/308 |
| 3,572,122 | 3/1971 | Nusbaum | 73/314 |

Primary Examiner—Richard C. Queisser
Assistant Examiner—Daniel M. Yasich
Attorney, Agent, or Firm—Edward U. Dithmar

[57] ABSTRACT

A control system usable with any of a number of similar rod type tank gages having a gaging rod extensible from a tank and a float member within the tank connected with the rod for positioning same in accordance with liquid level, the control system having structure mountable on the tank for cooperation with the gaging rod, a magnetized member on the gaging rod exterior of the tank, at least one switch on the structure adapted to be actuated by the magnetized member and electrical conductors leading from the switch and adapted to be connected to remote control apparatus such as audio, visual, or valve actuating means responsive to switch action. In more detailed aspect, the control system has a plurality of switches responsive to different liquid levels, and a fail-safe stop member for the gaging rod, together with means responsive to engagement between the gaging rod and the stop member for indicating a malfunction condition. The control system operates at extremely low electrical energy levels, rendering the system safe for use in hazardous areas, and the conductors leading from the switches extend to control apparatus located in non-hazardous areas.

8 Claims, 5 Drawing Figures

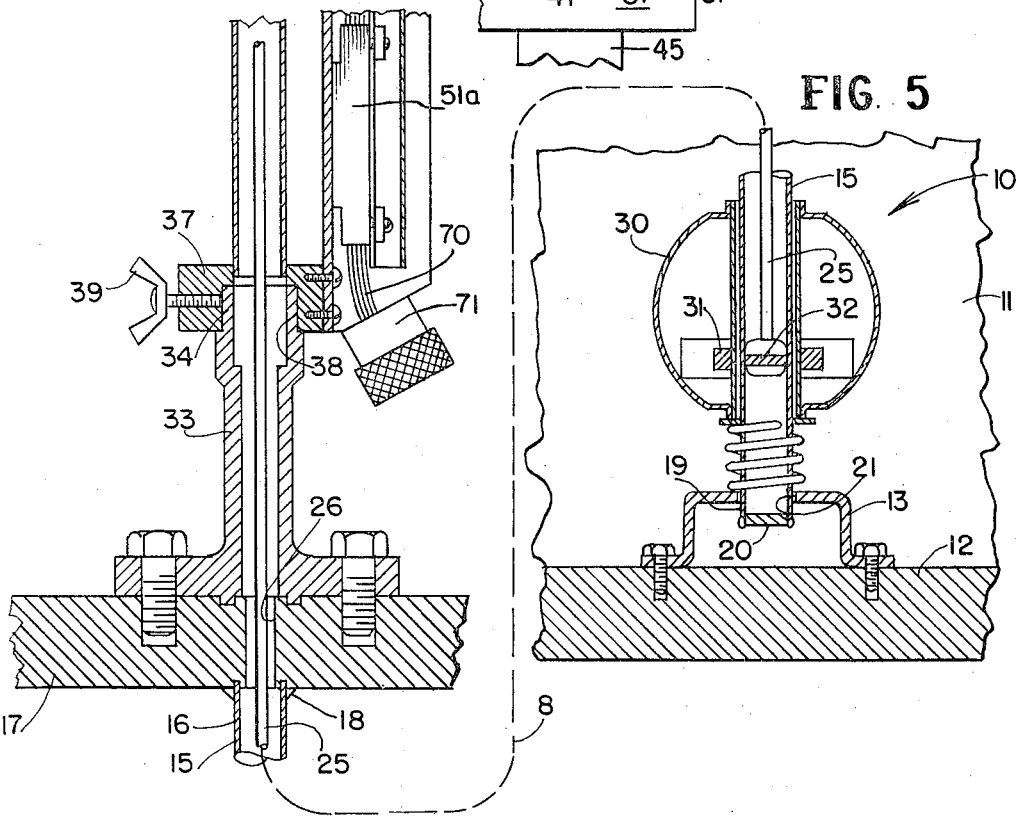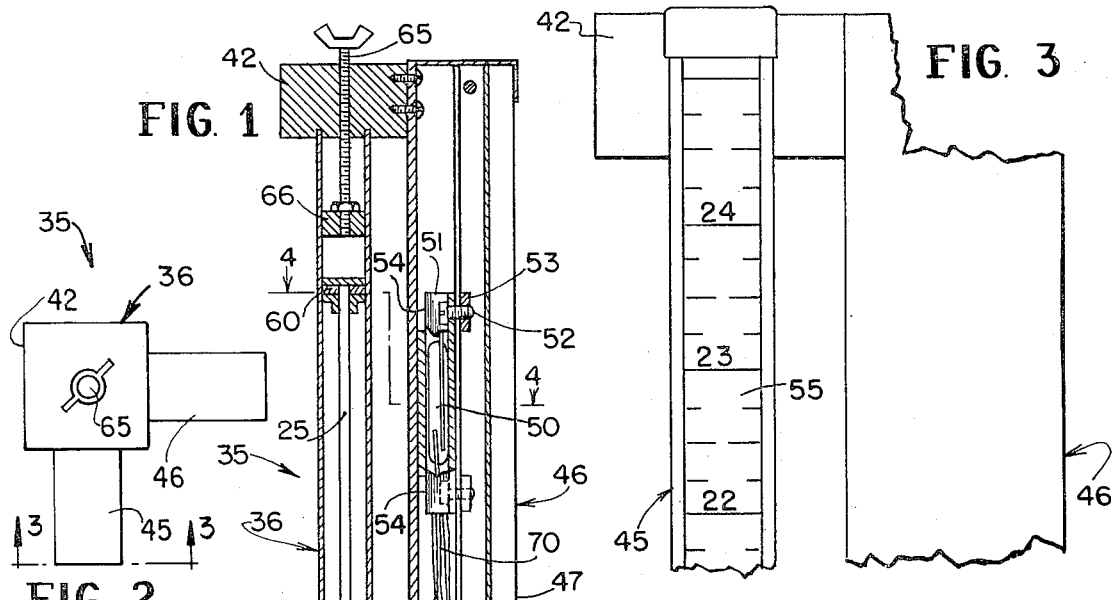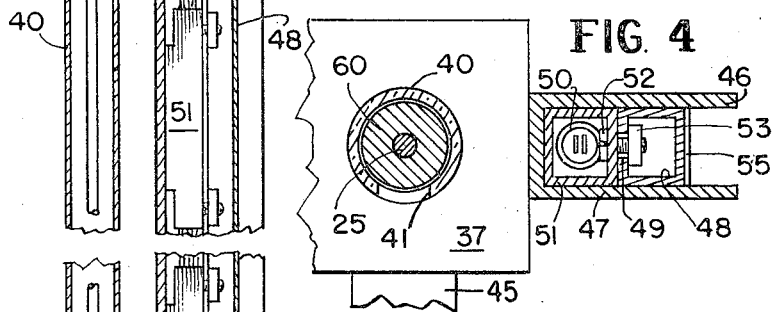

CONTROL SYSTEM FOR ROD TYPE TANK GAGE

BACKGROUND OF THE INVENTION

This invention relates to gaging devices for indicating liquid level in tanks, and more particularly to a control system for use with a rod type tank gage having a gaging rod extensible from a tank and a float member within the tank connected with the rod for positioning same in accordance with liquid level.

The rod type tank gage with which the present control system may be used preferably is a closed system which seals the liquid in the tank from the outside atmosphere and which does not employ a packing gland to seal the gaging rod with respect to the tank.

One object of the invention is to provide a control system usable on any one of a plurality of tanks having rod type tank gages. To this end the control system is readily attachable on and detachable from a tank located at a gaging station.

Another object is to provide a control system which when used permits the tank gage to be read visually in generally the same manner as if the control system were not used, the reading in both cases being a function of gaging rod level.

Another object is to provide a control system which operates at extremely low levels of electrical energy, the electrical elements in the system being such that the system safely can be used in a hazardous area. Electrical conductors extend from the control system to associated remote electrical control apparatus, such as audio, visual, or valve actuating means located in a nonhazardous area.

Another object is to provide a control system wherein control elements are readily adjustable so that associated control apparatus may be actuated at various desired levels of liquid in the tank. For example, if a tank is being filled by means of two or more flow lines, a first flow line may be closed by the control system when the liquid level approaches final level, and the second flow line closed when the level reaches final level.

Still another object is to provide a control system having a fail-safe mechanism and control means responsive thereto which will perform a desired function in the event there has been a malfunction in other parts of the system.

Another object is to provide a control system which operates substantially automatically in connection with filling a tank, giving appropriate indication when the tank is filled, or shutting off the tank filling lines when the tank is filled. The control system also can be operated manually to determine whether or not the associated control apparatus is functioning satisfactorily.

SUMMARY OF THE INVENTION

The invention contemplates a control system for use with a rod type tank gage having a gaging rod extensible from a tank and a float member within the tank connected to the rod for positioning same in accordance with liquid level.

The control system comprises an elongated structure adapted to be mounted on an exterior portion of the tank in alignment with the gaging rod, the structure including guide means for the gaging rod and index means for visually indicating rod position. A magnetized member is carried by the gaging rod exterior of the tank.

At least one switch adapted to be actuated by the magnetized member is mounted in predetermined position on the elongated structure, and electrical conductors leading from the switch are adapted to be connected to control apparatus such as audio, visual, or valve actuating means responsive to switch action. The switch is designed to operate at an extremely low level of electrical energy, and preferably is contained in a sealed housing, rendering the control system safe for use in a hazardous area.

In more detailed aspect, the switch is mounted on a carriage member which in turn is mounted on the elongated structure for longitudinal adjustment, enhancing the flexibility of the control system.

In further detailed aspect, the control system of the invention has a plurality of switches adapted to be actuated by the magnetized member on the control rod, and all switches may be mounted on carriage members for ease of adjustment. In some cases, the switches themselves may be adjustably mounted on adjustable carriage members.

In a preferred embodiment of the invention, the switches used are magnetically operated reed switches enclosed in sealed or explosion-proof housings, rendering the control system safe for use in explosive atmospheres.

The control system desirably includes a fail-safe stop member engageable by the gaging rod at a time when the magnetized member thereon has passed the other switches, which stop member halts further movement of the gaging rod. Where the gaging rod and float member of the rod type tank gage are connected by a magnetic couple, further tank filling and consequent further elevation of the float member causes disconnection of the magnetic couple, following which the gaging rod drops to a lower level. The control system includes means responsive to rod drop adapted to actuate means for indicating the rod drop condition.

BRIEF DESCRIPTION OF THE DRAWING

FIG. 1 is a longitudinal sectional view, partly broken away, through a control system embodying the invention.

FIG. 2 is a top plan view of the control system.

FIG. 3 is an enlarged fragmentary elevational view taken generally on line 3—3 of FIG. 2.

FIG. 4 is an enlarged sectional view on irregular line 4—4 of FIG. 1.

FIG. 5 is a fragmentary sectional view of a rod type tank gage with which the control system of the invention may be used.

DESCRIPTION OF THE PREFERRED EMBODIMENT

Referring first to FIGS. 1 and 5, the structures there shown are connected physically, as indicated by broken line 8. The structure shown in FIG. 5 and a small part of the structure shown at the bottom of FIG. 1 illustrate a rod type tank gage suitable for use with the control system of the present invention. The illustrated rod type gage first will be described briefly.

Referring to FIG. 5, the illustrated rod type tank gage is generally designated 10, and it is adapted to be mounted inside a tank 11 having a portion 12, which may be the tank bottom. A suitable bracket 13 (optional) secured to portion 12 may receive one end of tank gage 10.

Gage 10, as illustrated, includes an imperforate tube member 15 extending more or less vertically within tank 11 between upper and lower tank portions. As shown, upper end 16 of tube member 15 (bottom of FIG. 1) is secured to a tank wall or manway cover 17 by a sealed connection 18 usually formed by welding. The other or lower end 19 of tube member 15 is closed by a plug 20, usually welded in place, meaning that the interior of tube member 15 is isolated from the tank interior and the contents of the tank.

Bracket 13, if used, has an opening 21 which receives and secures lower end 19 of tube member 15.

A gaging rod 25 is contained within tube member 15, and is adapted to be extensible from tank 11. Accordingly, tank wall or manway cover 17 has an opening 26 (FIG. 1) through which rod 25 extends.

A float member 30 (FIG. 5) surrounds and is guided in up and down movement by tube member 15. Float member 30 is connected with rod member 25 by means of a magnetic couple provided by a magnet 31 in float member 30 and a magnet 32 mounted on rod member 25. When the magnetic couple is in effect, gaging rod 25 moves up and down as float member 30 rises and falls with the level of the liquid in tank 11. If the couple is broken, gaging rod 25 drops to a lower level, while float member 30 retains its position in the liquid.

As shown in the lower part of FIG. 1, tank gage 10 has a tubular head portion 33 mounted in sealed manner on the tank or manway cover 17 in alignment with rod 25, the portion 33 at its free end having a connecting portion 34 adapted to receive the control system of the invention which next will be described.

Still referring to FIG. 1, a control system embodying the invention, generally designated 35, includes an elongated structure 36 adapted to be detachably mounted directly or indirectly on an exterior portion of tank 11 in alignment with gaging rod 25. As shown, elongated structure 36 has a lower member 37 having a circular recess 38 adapted to receive connecting portion 34 of tubular head portion 33 of gage 10. Suitable means such as set screw 39 is provided for securing control system 35 to gage 10 of tank 11, and for permitting angular adjustment and ready disassembly.

Elongated structure 36 includes a guide means 40 for gaging rod 25, guide means 40, as shown, being a transparent tubular member extending substantially the length of elongated structure 36, the tubular member having a longitudinal slot 41 (FIG. 4) permitting access to gaging rod 25 for manual manipulation for testing purposes. The lower end of guide means 40 is received in a central opening in lower member 37.

An upper member 42 having generally the same shape as lower member 37 receives the upper end of guide means 40, as shown in FIG. 1, the guide member preferably being rotatable in members 37 and 42.

Lower member 37 and upper member 42 of elongated structure 36 support the opposite ends of a pair of elongated assemblies, designated 45 and 46 in FIG. 2, which are mounted in quadrature relation with respect to each other. Assemblies 45 and 46 are alike in some respects, and may or may not be alike in other respects. The assembly designated 46 is shown in FIG. 1, and a transverse sectional view thereof is shown in FIG. 4.

As shown in FIGS. 1 and 4, assembly 46 includes a channel member 47 secured to lower and upper members 37 and 42 and a rectangular tubular member 48 detachably mounted therein. Tubular member 48 has a slot 49 in the wall thereof facing the web of channel member 47, slot 49 extending the length of tubular member 48 either continuously or discontinuously.

Assembly 46 also includes one or more electrical switches 50 mounted in predetermined longitudinal position in the assembly adjacent the web of channel member 47. As shown in FIGS. 1 and 4, a switch 50 is mounted on a carriage member 51 (broken away in FIG. 1 to show switch 50), shown as a rectangular tubular member, which is movable longitudinally of assembly 46 so switch 50 is subject to ready longitudinal adjustment. As shown in FIGS. 1 and 4, carriage member 51 has bolts 52 extending through slot 49 in tubular member 48, nuts 53 on bolts 52 being provided to secure and release carriage member 51. The wall of carriage member 51 opposite bolts 52 is cut away at 54 to provide access to the bolts for carriage member adjustment when tubular member 48 is detached from channel member 47.

A front elevational view of assembly 45 is shown in FIG. 3, illustrating that assembly 45 (as well as assembly 46) carries an index means 55 for reading the level of gaging rod 25 directly. As shown in FIG. 4, index means 55 is secured to the exposed wall of tubular member 48 in assembly 46.

As will be understood, one purpose of the two assemblies 45 and 46 is to provide adequate structural strength for elongated structure 36. Also, the two assemblies, each with an index means 55, permit direct reading over an enlarged viewing angle, which angle is subject to rotatable adjustment, if needed, by means of the manner lower member 37 is mounted on gage head portion 33.

While switches 50 may be mounted in both assemblies 45 and 46, they usually will be carried in one or the other of them, unless the number of switches used is unduly great. Carriage members 51 may be provided for some or all of switches 50, and in some cases, two switches 50 may be mounted on a single carriage member 51. A switch 50 itself may be adjustably mounted on a carriage member 51, providing greater flexibility.

Switches 50 are magnetically actuated, and preferably are magnetically operated reed switches enclosed within a housing. Because control system 35 often is located in a hazardous area, for example in an explosive atmosphere, it is important in such instance that the switch housings be sealed explosion-proof housings.

As a further safety measure, switches 50 operate at an extremely low level of electrical energy, and control apparatus actuated by switches 50 is located remotely in a non-hazardous area, or the apparatus is contained in sealed explosion-proof housings.

Referring to FIGS. 1 and 4, the magnetically operated switches 50 are actuated by a magnetized member 60 carried at the upper end of gaging rod 25 of gage 10. Member 60, of course, provides a magnetic field which actuates a switch 50 when member 60 is substantially at the level of the switch.

Remembering that guide means 40 for gaging rod 25 is transparent, magnetized member 60 may serve as an indicator to be read on index means 55 in making a visual reading of gage 10. Index means 55 for a particular tank may be calibrated to read in hundreds of gallons, for example.

Upper member 42 of elongated structure 36 has a threaded central opening, and a wing bolt 65 extends through this opening. A fail-safe stop member 66 is carried at the free end of bolt 65 within guide means 40 for gaging rod 25. The longitudinal position of stop means 66 is adjustable by means of bolt 65.

In the event of some malfunction in the control system or control apparatus associated with the system during a tank filling operation, the flow line or lines will not be closed in response to action of the switch or switches 50, and tank filling will continue beyond the desired level. When this occurs, magnetized member 60 or the upper end of gaging rod 25 engages stop member 66, halting further elevation of gaging rod 25, while float 30 of gage 10 continues to rise as liquid level increases. Slight displacement between magnet 32 (FIG. 5) at the lower end of gaging rod 25 and float magnet 31 will break the magnetic couple between the two magnets, causing gaging rod 25 to drop to a lower level, e.g. to closure plug 20 at the lower end of tube member 15.

Means responsive to a drop of gaging rod 25 is provided to indicate the rod drop condition resulting from a malfunction, and such means is adapted to actuate auxiliary control apparatus such as audio, visual, or valve actuating means not shown. In the illustrated embodiment, such responsive means is a switch similar to switch 50 (not shown) mounted on a carriage 51a positioned at or near the lower end of elongated structure 36.

Conductors 70 (FIG. 1) leading from switches 50, as mentioned, are adapted to be connected to control apparatus such as audio, visual, or valve actuating means located in a non-hazardous area remote from control system 35. As shown, conductors 70 terminate in a female receptacle 71 mounted at the lower end of elongated structure 36. A cooperating male connector (not shown) is provided on a cable leading to the remotely located control apparatus.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. For use with a rod type tank gage having a gaging rod extensible from a tank and a float member within the tank connected by a magnetic couple with the rod for positioning same in accordance with liquid level, a control system, comprising:

an elongated structure mounted on an exterior portion of the tank in alignment with the gaging rod, said structure including transparent guide means for the gaging rod and an index means in effective relation with said rod for visually indicating rod position;

a magnetized member secured to the gaging rod exterior of the tank;

at least one switch actuatable by said magnetized member and mounted in predetermined position on said elongated structure;

electrical conductors leading from said switch for connection to associated control apparatus such as audio, visual, or valve actuating means responsive to switch action;

a fail-safe stop member on said elongated structure for engagement by said gaging rod, continued rise in fluid level following such engagement effective to break the magnetic couple between rod and float member, causing said gaging rod to drop; and means responsive to rod drop for actuating means for indicating the rod drop condition.

2. The control system of claim 1 with the addition of a carriage member mounted on said elongated structure for longitudinal adjustment, said switch mounted on said carriage member.

3. The control system of claim 1 with the addition of one or more additional switches actuatable by said magnetized member mounted in predetermined position on said elongated structure, and electrical conductors leading from each additional switch for connection to associated control apparatus.

4. The control system of claim 3 with the addition of one or more additional carriage members mounted on said elongated structure for longitudinal adjustment, each additional switch mounted on a carriage member.

5. The control system of claim 1 wherein said switch actuatable by said magnetized member is a magnetically operated reed switch enclosed in an air tight housing, thereby rendering the system safe for use in an explosive environment.

6. The control system of claim 1 wherein said guide means for the gaging rod is open in part, providing access to the gaging rod whereby the rod is movable manually for checking the response of said switch and the associated control apparatus.

7. The control system of claim 1 with the addition of means for adjusting said fail-safe stop member longitudinally on said elongated structure.

8. The control system of claim 1 with the addition of means for detachably mounting said elongated structure on said tank, whereby a single control system readily is usable with a plurality of tanks having compatible gages and control system mounting means.

* * * * *